US011115883B2

United States Patent
Ljung et al.

(10) Patent No.: US 11,115,883 B2
(45) Date of Patent: Sep. 7, 2021

(54) NETWORK CONTROLLED FILTERING OF MOBILITY INFORMATION

(71) Applicant: Sony Mobile Communications Inc., Tokyo (JP)

(72) Inventors: Rickard Ljung, Helsingborg (SE); Daniel Lönnblad, Lund (SE)

(73) Assignee: SONY GROUP CORPORATION, Tokyo (JP)

(*) Notice: Subject to any disclaimer, the term of this patent is extended or adjusted under 35 U.S.C. 154(b) by 231 days.

(21) Appl. No.: 16/074,272

(22) PCT Filed: Mar. 30, 2016

(86) PCT No.: PCT/US2016/024991
§ 371 (c)(1),
(2) Date: Jul. 31, 2018

(87) PCT Pub. No.: WO2017/171754
PCT Pub. Date: Oct. 5, 2017

(65) Prior Publication Data
US 2020/0229050 A1    Jul. 16, 2020

(51) Int. Cl.
*H04W 36/00* (2009.01)
*H04W 24/02* (2009.01)
(Continued)

(52) U.S. Cl.
CPC ..... *H04W 36/00837* (2018.08); *H04W 24/02* (2013.01); *H04W 24/10* (2013.01);
(Continued)

(58) Field of Classification Search
CPC . H04W 36/0083; H04W 24/02; H04W 24/10; H04W 36/0061; H04W 36/04; H04W 36/30
See application file for complete search history.

(56) References Cited

U.S. PATENT DOCUMENTS

2011/0105119 A1* 5/2011 Bienas ............. H04W 36/0055
455/436
2011/0143660 A1* 6/2011 Iwamura ............. H04W 76/19
455/39
(Continued)

FOREIGN PATENT DOCUMENTS

CN        105122886 A    12/2015
EP        2947916 A2    11/2015
(Continued)

OTHER PUBLICATIONS

Office Action with English translation issued in corresponding Chinese Application No. 201680082670.X, dated May 18, 2020. 17 pages.
(Continued)

*Primary Examiner* — Ernest G Tacsik
(74) *Attorney, Agent, or Firm* — Tucker Ellis LLP (57) ABSTRACT

Devices, systems, and methods are disclosed for network-controlled UE filtering of detected cell reporting. The network instructs currently-connected UEs to only report neighboring cells that meet network-defined mobility filtering criteria and, in some embodiments, additional non-mobility filtering criteria. In response to receiving such instructions from the network, the UEs will apply the filtering criteria to at least the data associated with neighboring cells and, in some embodiments, data of the UE to determine which of the neighboring cells meet the filtering criteria. Once the UEs have determined that one or more neighboring cells meets the filtering criteria, the UEs communicate a detected cell report back to the network, which, according to specific embodiments of the invention, may be limited to identification of the neighboring cells that meet the mobility filtering criteria and, in some embodiments, additional non-mobility filtering criteria.

18 Claims, 5 Drawing Sheets

(51) Int. Cl.
    *H04W 24/10*    (2009.01)
    *H04W 36/04*    (2009.01)
    *H04W 36/30*    (2009.01)
(52) U.S. Cl.
    CPC . *H04W 36/0061* (2013.01); *H04W 36/00835* (2018.08); *H04W 36/04* (2013.01); *H04W 36/30* (2013.01)

(56) References Cited

U.S. PATENT DOCUMENTS

| | | | | |
|---|---|---|---|---|
| 2011/0149921 | A1* | 6/2011 | Shin | H04W 16/02 370/336 |
| 2012/0058763 | A1* | 3/2012 | Zhao | H04W 48/20 455/434 |
| 2012/0295606 | A1* | 11/2012 | Sebire | H04W 36/0094 455/422.1 |
| 2014/0204908 | A1* | 7/2014 | Keller | H04W 36/0066 370/331 |
| 2014/0211763 | A1* | 7/2014 | Choi | H04W 36/00837 370/332 |
| 2014/0247807 | A1* | 9/2014 | Westerberg | H04W 36/34 370/331 |
| 2014/0256348 | A1* | 9/2014 | Wirola | H04W 64/00 455/456.1 |
| 2015/0223145 | A1* | 8/2015 | Yoon | H04W 48/04 370/328 |
| 2016/0021594 | A1 | 1/2016 | Yilmaz et al. | |

FOREIGN PATENT DOCUMENTS

| | | |
|---|---|---|
| GB | 2472792 A | 2/2011 |
| WO | 2014007687 A1 | 1/2014 |
| WO | 2015082252 A3 | 6/2015 |

OTHER PUBLICATIONS

International Search Report and Written Opinion for corresponding International Application No. PCT/US2016/024991, dated Sep. 21, 2016. 13 Pages.

* cited by examiner

NETWORK CONTROLLED FILTERING OF MOBILITY INFORMATION

FIELD OF THE INVENTION

In general, embodiments of the invention relate to mobile telecommunications and, more particularly, methods, apparatus, computer program products and the like for network-controlled filtering of cell mobility information measured and reported by User Equipment (UE) and subsequently used by the network in making handover decisions.

BACKGROUND

Kinetic networks is a developing concept in the wireless network realm that relies on moving cells, in which the moving cell involves base station-type transmissions from mobile devices of different types, which act as base stations wither on a permanent or temporary basis. One type of moving cell is a conventional base station that is equipped with wireless backhaul (e.g., via separate Radio Access Technology (RAT)) and, therefore, can be movable or moving (e.g., a conventional base station with wireless backhaul affixed to a moving transportation means). Another type of moving cell is conventional mobile terminal, otherwise referred to herein as User Equipment (UE), that has been temporarily configured by the network as an anchor point within a temporary micro cell for relaying of data from other UEs within the micro cell to the stationary cell (i.e., eNodeB).

Thus, in future network deployment scenarios, it is possible to envision a massive deployment of devices that can act (or are acting) as moving cells within a kinetic network architecture. Each of these different devices acting as moving/mobile cells may have very disparate mobility characteristics. For example, envision the case in which each vehicle in an urban are is equipped with a mobile cell, each vehicle will be moving in different directions and at different speeds.

For a UE operating in an environment in which a large volume of moving cells are within detection distance, the mobility characteristics of the moving/mobile cell should be taken into account in order to insure that the UE is utilizing a moving/mobile cell that has similar mobility characteristics as the UE.

Therefore, a need exists to develop systems, methods, devices, computer program products and the like that address problems associated with mobile cells. Specifically, a need exists for developing means to insure that a UE utilizes a mobile cell with similar characteristics. Moreover, the desired means should limit the amount of mobile cell characteristic reporting that is required by UEs during a mobile cell handover process, so as to lessen control signaling and allow for such reporting to occur absent modification in current uplink UE measurement reporting.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for network-controlled filtering of cell reporting conducted by UEs in a moving/mobile cell environment. In this regard, the present invention provides for the network to instruct currently-connected UEs to only report neighboring cells that meet (or exceed) network-defined mobility filtering criteria (i.e., filtering parameters/thresholds or the like). Other non-mobility filtering criteria may also be defined by the network, e.g., criteria related to signal strength and/or quality of signal. In response to receiving such instructions from the network, the UEs will apply the mobility filtering criteria to at least the mobility data associated with neighboring cells to determine which of the neighboring cells meet or exceed the mobility filtering criteria. In additional embodiments, in which the filtering criteria includes non-mobility criteria, the UEs will additionally apply the non-mobility filtering criteria to other reported data associated with neighboring cells to determine which of the neighboring cells meet or exceed both the mobility and the non-mobility filtering criteria. Once the UEs have determined that one or more neighboring cells meets or exceeds the mobility filtering criteria and, in some embodiments, both the mobility and non-mobility criteria), the UEs communicate a detected cell report cells back to the network, which, according to specific embodiments of the invention, may be limited to identification of the neighboring cells that meet or exceed the mobility filtering criteria or the mobility and non-mobility filtering criteria (i.e., the detected cell report may not contain any of the actual mobility data or non-mobility data from the neighboring cells).

In accordance with specific embodiments of the invention, the network-defined mobility filtering criteria may be absolute mobility criteria that is independent of the mobility of the UE and/or the network-defined mobility filtering criteria may be relative mobility criteria that is dependent upon the mobility characteristics of the UE. In those embodiments in which the network-defined mobility filtering criteria includes one or more relative mobility criterion, the UE applies the mobility filtering criteria to the mobility data associated with neighboring cells in conjunction with the UE's own mobility characteristics to determine which of the neighboring cells meet or exceed the mobility filtering criteria.

As such the present invention provides a process for insuring that UEs are connected to, or otherwise handed over to, cells that meet or exceed network-defined mobility criteria, which according to the criteria may equate to cells that have mobility characteristics similar to the UE. Moreover, by having the UEs apply the mobility filtering criteria and, in some embodiments, additional non-mobility filtering criteria and determining which neighboring cells meet or exceed the criteria the present invention provides for limiting the amount of information that is required to be reported back to the network, i.e., the detected cell report may, in certain embodiments, be limited to only identifying those neighboring cells that meet or exceed the mobility filtering criteria or the mobility filtering criteria and the non-mobility filtering criteria. By limiting the information required in the detected cell report, the present invention limits control signaling and allows for the reporting to occur absent modification to the existing uplink UE measurement reporting scheme.

A method for network-controlled filtering of detected cell reporting defines first embodiments of the invention. The method includes receiving, at a UE, a network-based request to report detectable neighboring cells, which includes mobility filtering criteria (otherwise referred to as filtering parameters or thresholds). The method further includes receiving, at the UE, cell mobility data associated with one or more neighboring cells and determining, at the UE, which of the one or more neighboring cells meets or exceeds the mobility filtering criteria based at least on application of the cell mobility data to the mobility filtering. In addition, the method includes, in response to determining that at least one neighboring cell meets or exceeds the mobility filtering criteria, communicating, to the network, a detected cell report that identifies the at least one neighboring cell that has been determined to meet or exceed the mobility filtering criteria.

In other specific embodiments of the method, receiving the request to report detectable neighboring cells may further include receiving, at a UE, a network-based request to report detectable neighboring cells, which includes non-mobility filtering criteria. In such embodiments of the method, receiving cell mobility data may further include receiving, at the UE, other non-mobility cell data from the neighboring cells and determining may further include determining, at the UE, which of the one or more neighboring cells meets or exceeds the mobility filtering criteria and the non-mobility filtering criteria based at least on application of the cell mobility data to the mobility filtering criteria and the non-mobility cell data to the non-mobility filtering criteria. In further such embodiments of the method, communicating the detected cell report may further include communicating, to the network, the detected cell report that identifies the at least one neighboring cell that has been determined to meet or exceed the mobility filtering criteria and meet or exceed the non-mobility filtering criteria.

In specific embodiments of the method, the detected cell report is limited to only identifying the at least one neighboring cell that has been determined to meet or exceed the mobility filtering criteria and, in some embodiments, the mobility filtering criteria and the non-mobility filtering criteria, while in other embodiments the detected cell report may additionally include cell mobility data and/or other cell data from the at least one neighboring cell that meets or exceeds the mobility filtering criteria and, in some embodiments, the mobility filtering criteria and the non-mobility filtering criteria. In this regard, according to specific embodiments of the invention, the detected cell report is devoid of any identification or cell data of neighboring cells that do need meet or exceed the mobility filtering criteria.

In other specific embodiments of the method, the mobility filtering criteria includes one or more of absolute mobility filtering criteria, which is independent of the mobility characteristics of the UE and relative mobility filtering criteria, which is dependent upon the mobility characteristics of the UE. In those embodiments of the method in which the mobility filtering criteria includes absolute mobility filtering criteria, the absolute mobility filtering criteria may include, but is not limited to, one or more of (i) cells with a velocity below a predetermined threshold, (ii) cells moving at a predetermined direction, (iii) cells within a predetermined angle of velocity, or (iv) cells with a velocity of zero. In those embodiments of the method in which the mobility filtering criteria includes relative mobility filtering criteria, the relative mobility filtering criteria may include, but is not limited to, one or more of (i) cells with a velocity within a threshold range of a velocity of the UE, (ii) cells moving in a direction within a threshold range of a direction of the UE, and (iii) cells having an angle of velocity within a threshold range of an angle of velocity of the UE.

In those embodiments of the method, in which the mobility filtering criteria is relative to the mobility characteristics of the UE, the method further includes determining or receiving, at the UE, UE mobility data and determining which of the one or more neighboring mobile cells meets or exceeds the mobility filtering criteria further includes determining, at the UE, which of the one or more neighboring mobile cells meets or exceeds the mobility filtering criteria based applying the mobile cell mobility data, in combination with the UE mobility data to the mobility filtering criteria.

In further specific embodiments of the method, receiving the mobile cell mobility data further includes receiving a mobility vector from the one or more neighboring cells. The mobility vector identifies one or more of a current direction of movement of the cell, a current velocity of the cell, an average velocity of the cell and a current angle of velocity.

In still further embodiments of the method, receiving the network-based request to report detectable neighboring cells occurs in response to the UE reporting, to the network, an event that triggers the network to request reporting of detectable neighboring cells. In specific embodiments of the method, the triggering event comprises a signal quality of a current serving cell being detected as below a predetermined signal quality threshold.

In further specific embodiments of the method, the network-based request to report detectable neighboring cells is included within a Radio Resource Control (RRC) reconfiguration signal. In such embodiments of the method, the RRC reconfiguration signal may be configured to include an eNodeB signaled field in the reporting configurations that includes the mobility filtering criteria.

In still further specific embodiments the method may include, in response to communicating the detected cell report, receiving, at the UE, a handover command from the network that specifies handover to one of the one or more neighboring mobile cells meets or exceeds the mobility filtering criteria and, in some embodiments, meets or exceeds the mobility filtering criteria and the non-mobility filtering criteria.

A UE device for filtering detected cell reporting based on network-defined cell mobility filtering criteria, defines second embodiments of the invention. The device includes a computing platform including a memory and a processor in communication with the memory. The device further includes a detected cell reporting and filtering module that is stored in the memory and executable by the processor. The detected cell reporting and filtering module is configured to receive a request to report detectable neighboring cells, which includes mobility filtering criteria. The module is further configured to receive cell mobility data associated with one or more neighboring cells and, based at least on the cell mobility data, determine which of the one or more neighboring cells meets or exceeds the mobility filtering criteria. In addition, the module is configured to, in response to determining that at least one neighboring cell meets or exceeds the mobility filtering criteria, communicate, to the network, a detected cell report that identifies the at least one neighboring cell that has been determined to meet or exceed the mobility filtering criteria.

In other specific embodiments of the device, the module is configured to receive the request to report detectable neighboring cells which additionally includes non-mobility filtering criteria. In such embodiments of the device, the module is further configured to receive other non-mobility cell data from the neighboring cells and determine which of the one or more neighboring cells meets or exceeds the mobility filtering criteria and the non-mobility filtering criteria based at least on application of the cell mobility data to the mobility filtering criteria and the non-mobility cell data to the non-mobility filtering criteria. In further such embodiments of the device, the module is further configured to communicate the detected cell report that identifies the at least one neighboring cell that has been determined to meet or exceed the mobility filtering criteria and meet or exceed the non-mobility filtering criteria.

In specific embodiments of the device, the detected cell report includes only the identification of the at least one neighboring cell that has been determined to meet or exceed the mobility filtering criteria and, in some embodiments, the mobility filtering criteria and the non-mobility filtering criteria, while in other embodiments of the device, the detected cell report additionally includes cell mobility data and/or other cell data from the at least one neighboring cell that has been determined to meet or exceed the mobility filtering criteria and, in some embodiments, the mobility filtering criteria and the non-mobility filtering criteria.

In further specific embodiments of the device, the mobility filtering criteria includes at least one of absolute mobility filtering criteria independent of mobility of the UE and relative mobility filtering criteria dependent upon the mobility of the UE. In such embodiments of the device, the absolute mobility filtering criteria may include, but is not limited to, one or more of (i) cells with a velocity below a predetermined threshold, (ii) cells moving at a predetermined direction, (iii) cells within a predetermined angle of velocity, or (iv) cells with a velocity of zero. Further, the dependent mobility filtering criteria may include but is not limited to, one or more of (i) cells with a velocity within a threshold range of a velocity of the UE, (ii) cells moving in a direction within a threshold range of a direction of the UE, and (iii) cells having an angle of velocity within a threshold range of an angle of velocity of the UE.

In additional specific embodiments of the device, the detected cell reporting and filtering module is further configured to determine or receive UE mobility data and determine which of the one or more neighboring mobile cells meets or exceeds the mobility filtering criteria based at least on the mobile cell mobility data and the UE mobility data.

Thus, systems, apparatus, methods, and computer program products herein described in detail below provide for network-controlled filtering of detected cell reporting conducted by UEs in a moving/mobile cell environment. The network instructs currently-connected UEs to only report neighboring cells that meet network-defined mobility filtering criteria (i.e., filtering parameters/thresholds or the like) and, in some embodiments mobility and non-mobility filtering criteria. In response to receiving such instructions from the network, the UEs apply the mobility filtering criteria and, in some embodiments, additional non-mobility filtering criteria to at least the data associated with neighboring cells to determine which of the neighboring cells meet or exceed the mobility filtering criteria and, in some embodiments additional non-mobility filtering criteria. Once the UEs have determined that one or more neighboring cells meets or exceeds the mobility filtering criteria or, in some embodiments additional non-mobility filtering criteria, the UEs communicate a detected cell report back to the network, which, according to specific embodiments of the invention, may be limited to identification of the neighboring cells that meet the mobility filtering criteria (or mobility and non-mobility filtering criteria) or may be limited to mobility and/or non-mobility data related to the identified neighboring cells that meet the mobility filtering criteria (or mobility and non-mobility filtering criteria).

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A mobile device may be referred to as a node or user equipment ("UE"). For the purpose of sending or receiving data, the device may connect to a wireless local area network ("WLAN") or a mobile communication network (including evolution of 3GPP) LTE releases and $5^{th}$ Generation ("5G") LTE releases). Any network described herein may have one or more base stations ("BS"), otherwise referred to as an eNodeB (eNB) and/or access points ("AP").

As discussed in detail herein, the present invention provides for network-controlled UE filtering of detected cell reporting. The present invention provides for the network to instruct currently-connected UEs to only report neighboring cells that meet (or exceed) network-defined mobility filtering criteria (i.e., filtering parameters/thresholds or the like) and, in some embodiments mobility and non-mobility filtering criteria. The mobility filtering criteria may be absolute mobility filtering criteria, which is independent of the mobility characteristics of the UE and/or the relative mobility filtering criteria, which is dependent upon the mobility characteristics of the UE.

In response to receiving such filtering instructions from the network, the UEs will apply the mobility filtering criteria and, in some embodiments, additional non-mobility filtering criteria to the data associated with neighboring cells and, in those embodiments in which the filtering criteria is relative to the UE's mobility characteristics, the mobility data of the UE to determine which of the neighboring cells meet or exceed the mobility filtering criteria and, in some embodiments the mobility and non-mobility filtering criteria. Once the UEs have determined that one or more neighboring cells meets or exceeds the mobility filtering criteria and, in some embodiments, the mobility and non-mobility filtering criteria, the UEs communicate a detected cell report back to the network, which, according to specific embodiments of the invention, may be limited to identification of the neighboring cells that meet or exceed the mobility filtering criteria or in some embodiments, the mobility and non-mobility filtering criteria. In other embodiments of the invention, the detected cell report may additionally be configured to include the mobility and/or non-mobility data of the identified neighboring cells that meet the mobility filtering criteria.

The present invention provides for the network to control the mobility filtering criteria employed by a UE in determining which neighboring cells will be reported back to the network as viable cell candidates for the UE handover. In addition by limiting the detected cell report to, in some embodiments, only identification of the neighboring cells that meet the mobility filtering criteria and, in some embodiments, additional non-mobility filtering criteria, the present invention limits control signaling and allows for existing UE uplink measurement reporting schemes.

Figure 1A:
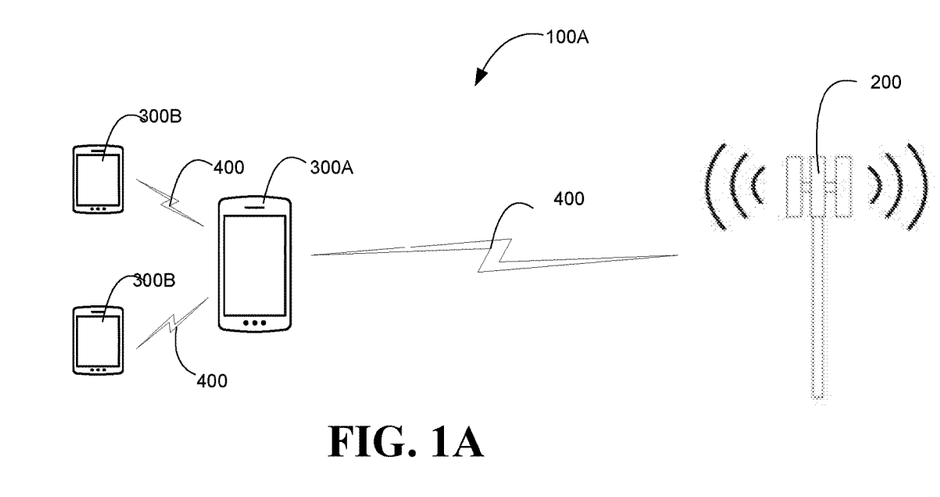
FIGS. 1A & 1B are schematic diagrams of mobile cells within a cellular system, in accordance with embodiments of the present invention.
Figure 1B:
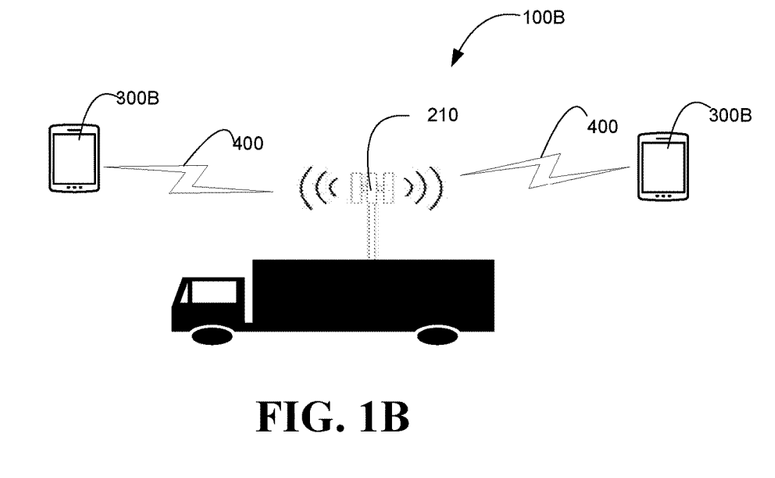

Referring to FIGS. 1A and 1B schematic diagrams are presented of cellular networks 100A and 100B; in accordance with embodiments of the present invention. The cellular network 100A of FIG. 1A comprises mobile cell 300A, which takes the form of a User Equipment (UE)/mobile terminal, which acts as a relaying UE for other UEs 300B which are wirelessly 400 connected to UE 300A (i.e., wireless backhaul e.g., with the same Radio Access Technology (RAT) as the mobile cell). The mobile cell 300A is wirelessly 400 connected to a stationary cell, such as a base station/eNodeB (eNB) 200, which is typically configured with a wired backhaul.

The cellular network 100B of FIG. 1B comprises a mobile cell 210, which takes the form of moving cell 210 disposed with a vehicle, such as cell located on a public transit vehicle or positioned in a geographic area that a temporarily high traffic load, commonly referred to as a "traffic hotspot", such as a concert, festival, sporting event or the like. The moving cell 210 includes wireless backhaul to a stationary cell (not shown in FIG. 1B) typically via a RAT separate from the RAT used to communicate with connecting UEs 300B. In specific embodiments of the invention, the mobile cell 300A or 210 is a multi-radio and/or multi-antenna device. For example, the mobile cell 200 may be equipped with LTE (Long Term Evolution) cellular band radio coverage with sector beam functionality and/or cm and mm distributed MIMO (Multiple-Input, Multiple-Output) system for 5G (Fifth Generation) configured for support of high data rate backhaul and mm wave mobile terminals with multi-beam function (e.g., mm wave cellular system with sector array antenna to link to mobile terminals). In addition, the mobile cell 300A or 210 may include a 4G (Fourth generation) LTE cellular band antenna array having omni coverage either with an omni antenna array or sector antenna array.

Figure 2:
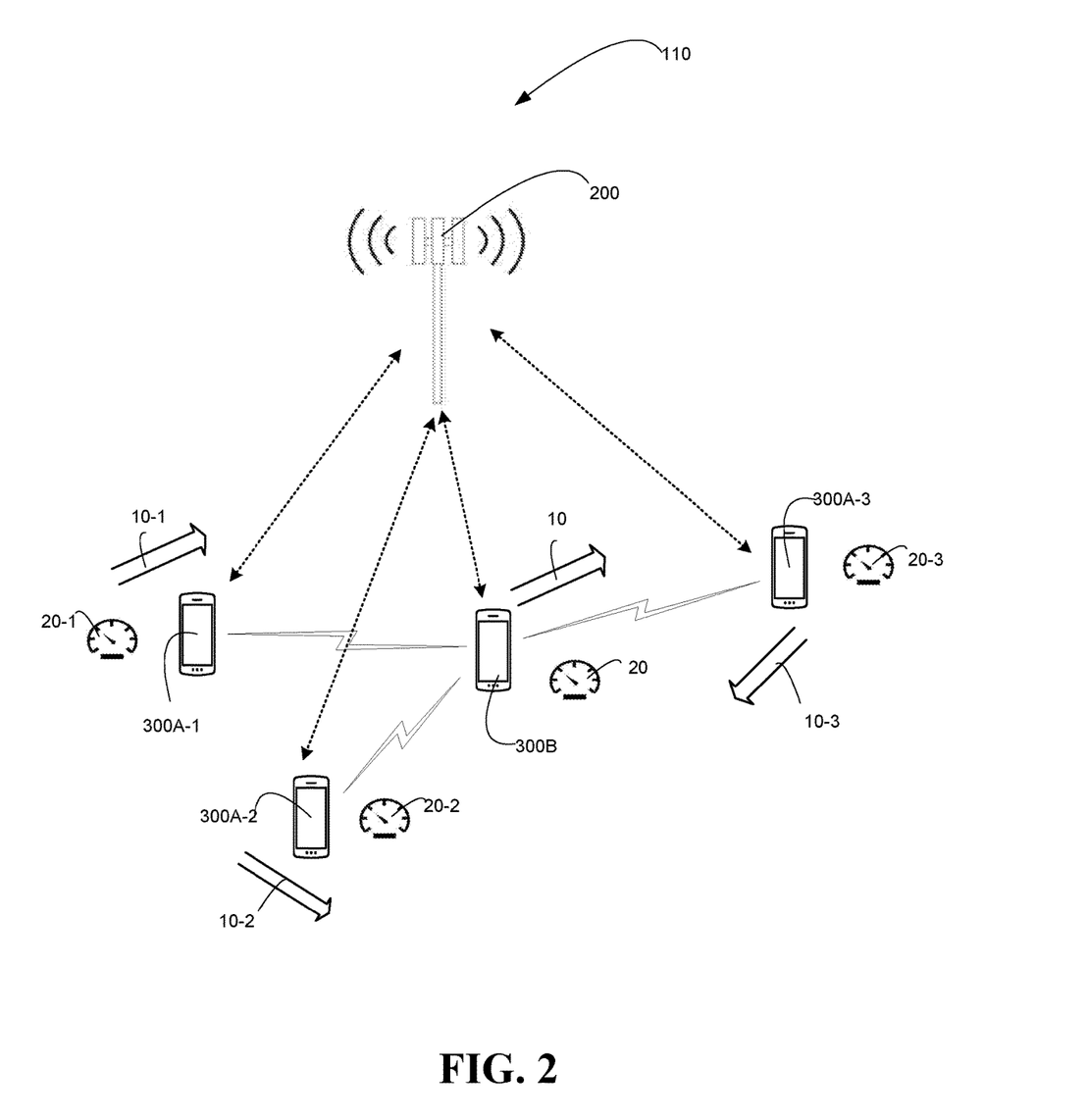
FIG. 2 is a schematic diagram of neighboring mobile cells in a cellular system highlighting the mobile cells' mobility data, in accordance with embodiments of the present invention.

Referring to FIG. 2 a schematic diagram is presented that the mobility of mobile cells within a cellular network 110 and 310, in accordance with embodiments of the present invention. In this regard, UE 300B is mobile device that is currently in connected mode via the stationary cell 200 or one of the mobile cells 300A-1, 300A-2 or 300A-3. In the illustrated example, of FIG. 2, the reader will assume that UE 300B is currently connected to the stationary cell 200, which serves as the primary cell. In the event that the UE 300B experiences service quality degradation (e.g., current link budget with the stationary cell 200 below a predefined threshold), UE 300B will report such an event to the primary cell (i.e., stationary cell 200). Primary cell (i.e., stationary cell 200), will respond, with a request to report neighboring cell mobility that includes mobility filtering criteria. In response to receiving the request from the primary cell, the UE will receive broadcast signals from mobile cells 300A-1, 300A-2, and 300A-3 that include a mobility vector. The mobility vector may include, at a minimum, directional data 10-1, 10-2, 10-3 and velocity/speed data 20-1, 20-2, 20-3 associated with the corresponding mobile cell 300A-1, 300A-2, and 300A-3. In addition, the UE 300B may receive/detect UE mobility data, including, at a minimum directional data 10 and velocity/speed data 10.

Once UE 300B has received the neighboring cell mobility data and detected its own mobility data, UE 300B will apply the mobility filtering criteria to the neighboring cell mobility data and, in some embodiments the combination of the neighboring cell mobility data and the UE mobility data to determine one or more neighboring cells that met or exceed the mobility filtering criteria. In response to determining at least one neighboring cell that meets or exceed the mobility filtering criteria, UE 300B signals back to the network a report that identifies the one or more neighboring cell that meets or exceed the mobility filtering criteria. The network uses the information in the report to identify a likely candidate for handover of the connection to the UE 300B.

Figure 3:
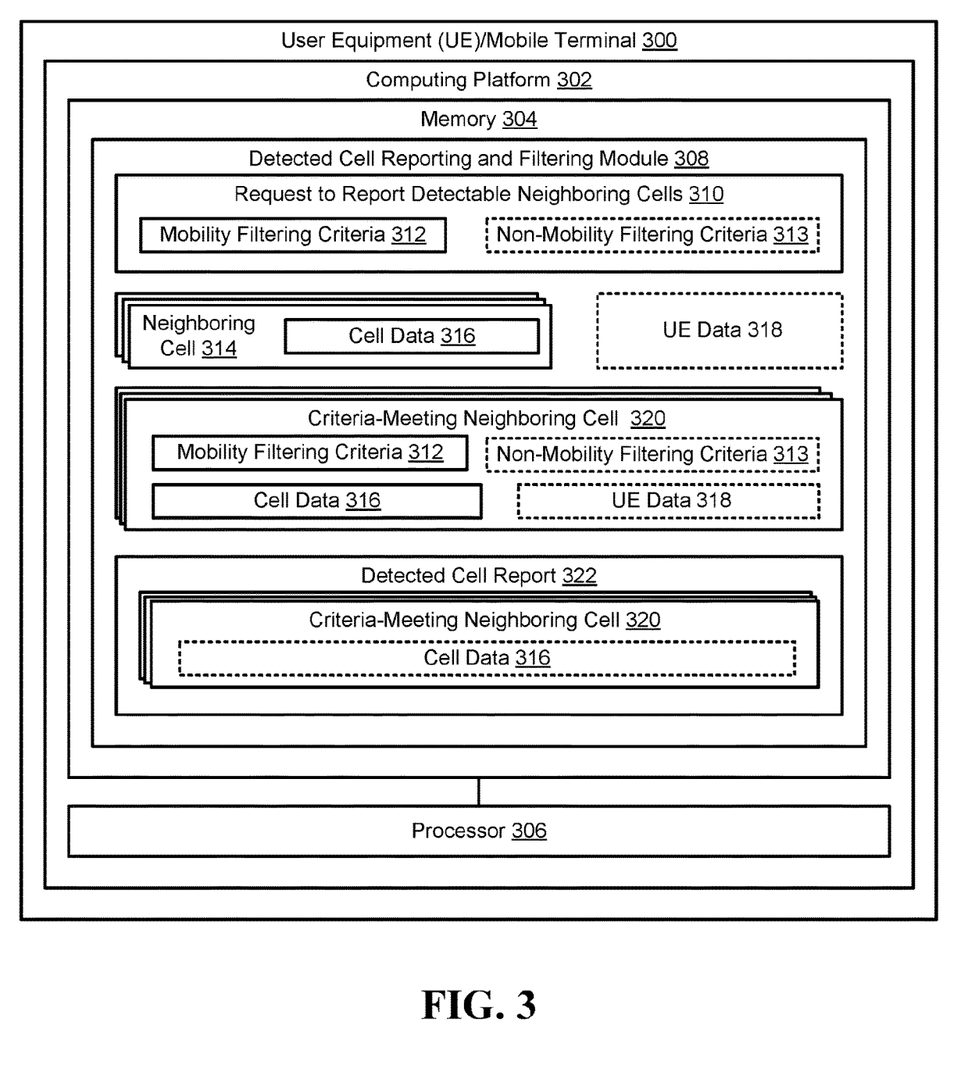
FIG. 3 is a block diagram of User Equipment (UE) configured for network-controlled filtering of cell mobility data, in accordance with embodiments of the present invention.

Referring to FIG. 3 is block diagram is presented of a User Equipment (UE)/mobile terminal 300 for network-controlled filtering of detected cells and subsequent detected cell reporting, in accordance with embodiments of the present invention. The UE 300 includes a computing platform 302 having a memory 304 and at least one processor 306 in communication with the memory 304.

Memory 304 may comprise volatile and non-volatile memory, such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 304 may comprise cloud storage, such as provided by a cloud storage service and/or a cloud connection service.

Further, processor 306 may be an application-specific integrated circuit ("ASIC"), or other chipset, processor, logic circuit, or other data processing device. Processor 306 or other processor such as ASIC may execute an application programming interface ("API") (not shown in FIG. 3) that interfaces with any resident programs or modules, such as detected cell reporting and filtering module 308 and routines, sub-modules associated therewith or the like stored in the memory 304 of computing platform 302.

Processor 306 includes various processing subsystems (not shown in FIG. 3) embodied in hardware, firmware, software, and combinations thereof, that enable the functionality of UE 300 and the operability of the UE 300 on a cellular network. For example, processing subsystems allow for initiating and maintaining communications and exchanging data with other network apparatus. For the disclosed aspects, processing subsystems of processor 306 may include any subsystem used in conjunction with detected cell reporting and filtering module 308 and related algorithms, sub-algorithms, modules, sub-modules thereof.

Computer platform 302 additionally includes a communications module (not shown in FIG. 3) embodied in hardware, firmware, software, and combinations thereof, that enables communications among the various components of the computing platform 302, as well as between the other networked apparatus. Thus, communication module may include the requisite hardware, firmware, software and/or combinations thereof for establishing and maintaining a network communication connection.

The memory 304 of UE 300 includes detected cell reporting and filtering module 308 that is configured to filter cell mobility data in accordance with network-defined mobility filtering criteria and report, to the network, cell(s) that meet or exceed the filtering criteria accordance with embodiments of the invention.

Specifically, detected cell reporting and filtering module 308 is configured to receive, from the network (i.e., eNodeB or the like), a request to report detectable neighboring cells 310 that includes network-defined mobility filtering criteria 312 (otherwise, referred to as filtering parameters or thresholds). In additional embodiments of the invention, the request to report detectable neighboring cells 310 additionally includes non-mobility filtering criteria 313, such as received signal strength above a predefined threshold, signal quality above a predefined threshold or the like. In specific embodiments of the invention, as shown in the signaling diagram of FIG. 4, the receipt of the request is preceded by the network receiving a signal from the UE that reports a triggering event (e.g., quality of the serving cell below a threshold or the like). The mobility filtering criteria 312 may be absolute mobility filtering criteria that is independent of the mobility of the UE and/or the criteria 312 may be relative mobility criteria 312 that is dependent upon the mobility of the UE.

The detected cell reporting and filtering module 308 is further configured to receive cell data 316 from one or more neighboring cells 314, which may include mobility data, as well as, other non-mobility data (e.g., signal strength, quality and the like). The mobility data may take the form of a mobility vector, which may indicate, velocity, direction, angle of velocity and the like. It should be noted that the neighboring cells 314 may be mobile cells or stationary cells. Mobile cells, as used herein, is any device that broadcasts signals that allows the device to be identified as a connectable cell (e.g., a cell ID, relay signal or the like) and transmits a mobility vector as a component of the device's broadcast signal. Conversely, a stationary cell will not include a mobility vector in the broadcast signal and, as such, the absence of such in the broadcast signal indicates that the cell is stationary (e.g., velocity of zero, no direction of movement and the like).

In additional embodiments of the invention, in which the mobility filtering criteria 312 is relative mobility filtering criteria dependent upon mobility of the UE, the module 308 will additionally receive or determine UE data 318 which may include mobility data (e.g., velocity, direction, angle of velocity and the like), as well as, other non-mobility data.

Further, the detected cell reporting and filtering module 308 is configured to determine which of the neighboring cells are criteria-meeting neighboring cells 320 by applying the mobility filtering criteria 312 and, in some embodiments, the non-mobility filtering criteria 313 to at least the cell data 316 and, in some embodiments of the invention, the cell data 316 in conjunction with the UE data 318.

In response to determining that at least one neighboring cell meets (or exceeds) the mobility filtering criteria 312 and/or the mobility filtering criteria 312 and the non-mobility filtering criteria 313, the module 308 communicates a detected cell report 322 to the network that identifies the criteria-meeting neighboring cell 320. In specific embodiments of the invention, in order to maintain UE uplink measurement reporting schemes, the detected cell report 322 is limited to only identifying the criteria-meeting neighboring cell(s) 320, while in other embodiments of the invention, the detected cell report 322 may include the cell data 316 or the cell mobility data of the criteria-meeting neighboring cells 320. In still further specific embodiments of the invention, the detected cell report 322 may include identification of the neighboring cells 314 that did not meet the mobility filtering criteria 312 and/or the cell data 316 of the neighboring cells 314 that did not meet the mobility filtering criteria 312.

Figure 4:
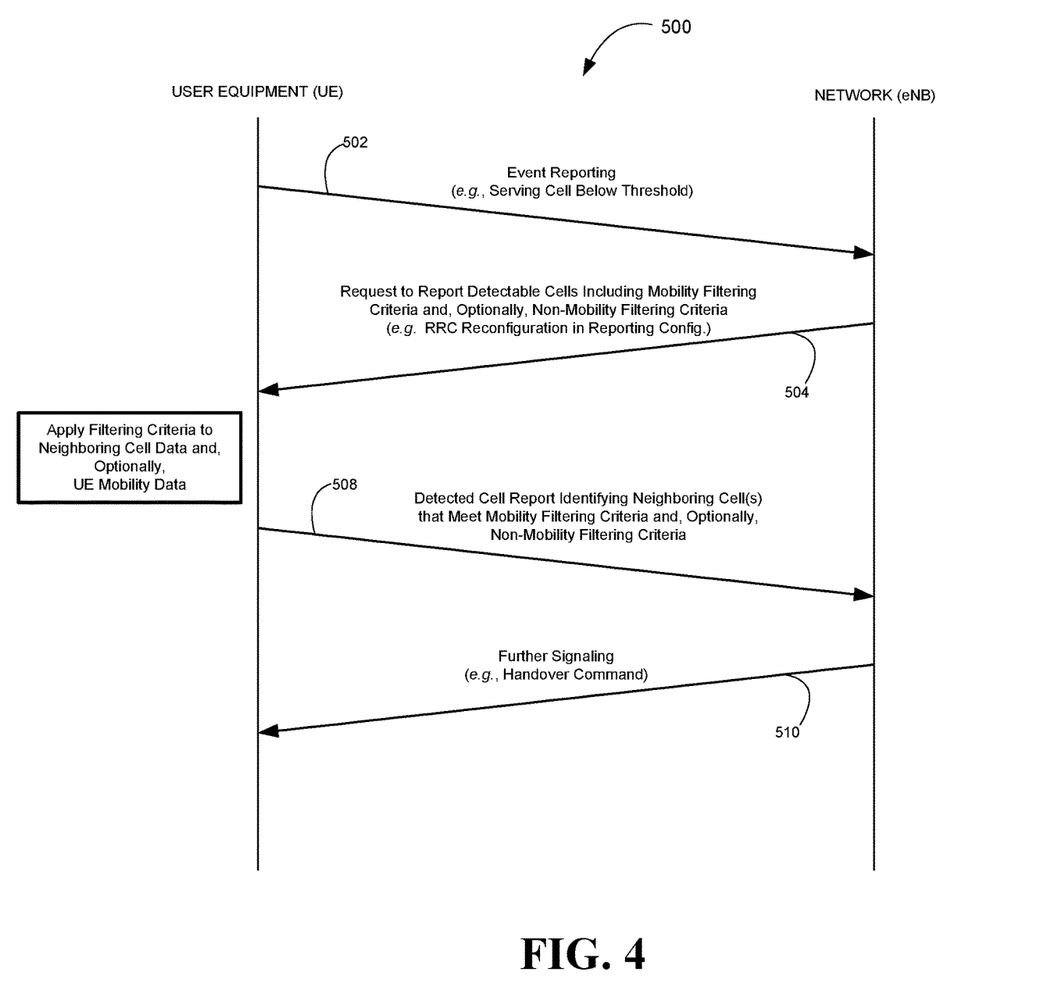
FIG. 4 is a network signaling diagramming illustrative of the signaling encompassed in network-controlled UE filtering of cell mobility data and subsequent detected cell reporting, in accordance with embodiments of the present invention.

Referring to FIG. 4, a signaling diagram 500 is presented that highlights the signaling entailed in network-defined UE filtering of detected neighboring cells and subsequent detected cell reporting, in accordance with embodiments of the present invention. At Event 502, a first signal is sent from a UE to the network (e.g., eNB) that reports a triggering event. In specific embodiments of the invention the triggering event may any event that prompts the network to request detection of neighboring cells, for example, the triggering event may be the serving cell having a quality below a predefined threshold. It should be noted that the serving cell (i.e., the cell that the UE is currently connected to) may be a mobile cell or a stationary cell). In addition, the UE may currently be simultaneously connected to multiple cells, i.e., a primary cell and one or more secondary cells. In such instances, the triggering event may include, but is not limited to, the current link budget of the primary cell or, optionally, one or more of the secondary cells, falling below a predefined quality threshold.

At Event 504, in response to the triggering event, the network (i.e., the current primary cell) communicates a request to the UE to report neighboring cells that includes at least mobility filtering criteria. In additional embodiments, the request may additionally include non-mobility filtering criteria. The request may be included within a dedicated signal, such as a Radio Resource Control (RRC) reconfiguration signal. In such embodiments of the invention, the filtering criteria may be included as an additional eNB signaled field in the reporting configurations. As previously noted the mobility filtering criteria may be absolute and/or relative mobility filtering criteria. The absolute mobility criteria filtering may include, but is not limited to, velocity of the neighboring cell, direction of the neighboring cell, angle of velocity of the neighboring dell, Doppler estimate of the neighboring cell or the like. The relative mobility filtering criteria may include, but is not limited to, velocity of the neighboring cell being within a threshold range of the velocity of the UE, the direction of the neighboring cell being within a threshold range of the direction of movement of the UE, the angle of velocity of the neighboring cells being within a threshold range of an angle of velocity of the UE and the like.

In response to receiving the request, the UE will receive cell data (e.g., mobility vector(s)) from one or more neighboring cells and, in some embodiments, in which relative mobility filtering criteria is implemented, receive/determine UE data, specifically UE mobility data. Further, the UE applies the mobility filtering criteria and, in some embodiments the additional non-mobility filtering criteria to the cell data and, in some embodiments, the combination of cell data and UE data to determine which neighboring cells meet (or exceed) the mobility filtering criteria and, in some embodiments, the additional non-mobility filtering criteria.

At Event 506, a detected cell report is communicated to the network (i.e., the primary cell eNB) that identifies the one or more neighboring cells that meet the mobility filtering criteria and, in some embodiments, the additional non-mobility filtering criteria. As previously noted, in order to maintain current UE uplink measurement reporting schemes, the detected cell report may be limited to (only include) the identification of the one or more neighboring cells that meet the mobility filtering criteria and, in some embodiments, the additional non-mobility filtering criteria. While in other embodiments of the invention, the detected cell report may additionally include the cell data, specifically the cell mobility data (velocity, angle of velocity, Doppler estimate or the like) associated with the one or more neighboring cells that meet the mobility filtering criteria or the additional non-mobility filtering criteria. In such embodiments of the invention, the request (Event 504) may include an indication that the report include the cell data of the one or more neighboring cells that meet the filtering criteria. In additional embodiments of the invention, the detected cell report may be configured to include identification of and/or cell data of the neighboring cells that were determined to not meet the mobility filtering criteria. In such embodiments of the invention, the request (Event 504) may include an indication that the report include identification of and/or the cell data of the one or more neighboring cells that do not meet the mobility filtering criteria.

At Event 510, further signaling from the network to the UE may ensue. Such further signaling may include, but is not limited to, a handover command to the UE that commands the UE to handover the connection to one of the identified neighboring cells that met the mobility filtering criteria and, in some embodiments, the additional non-mobility filtering criteria.

Figure 5:
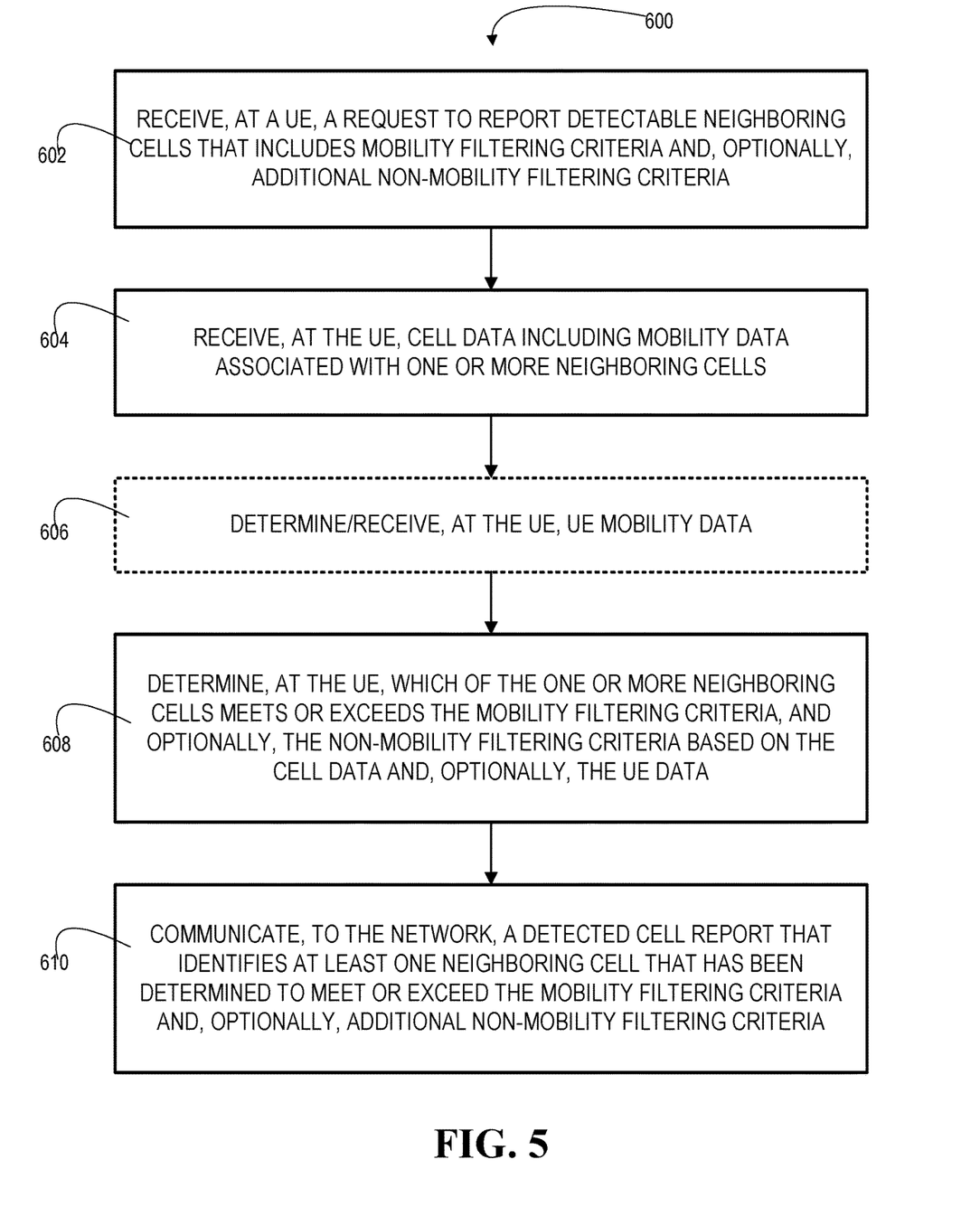
FIG. 5 is a flow diagram of a method for network-controlled UE filtering of cell mobility data and subsequent detected cell reporting, in accordance with embodiments of the present invention.

Referring to FIG. 5 a flow diagram is presented of a method 600 for network-controlled UE filtering of detected neighboring cells and subsequent detected cell reporting, in accordance with embodiments of the present invention. At Event 602, a UE receives a request, from a primary cell, to report neighboring cells that includes, at a minimum, mobility filtering criteria and, optionally, additional non-mobility filtering criteria. As previously discussed, the request may be preceded by the UE reporting a triggering event. The triggering event may be any event experienced by the UE that requires the network to request detection of neighboring cells and/or reporting of neighboring cell mobility, such as, for example, a connected cell (e.g., the primary cell) falling below a predetermined quality threshold.

The mobility filtering criteria may be absolute mobility filtering criteria independent of UE mobility and/or relative mobility filtering criteria that is dependent upon UE mobility. In addition to the mobility filtering criteria and, optional non-mobility filtering criteria, the request may additionally request other information in the detected cell report, such as cell data, specifically mobility data associated with neighboring cells that meet the mobility filtering criteria, UE mobility data, identification of neighboring cells that do not meet the mobility filtering criteria and/or cell mobility data of neighboring cells that do not meet the mobility filtering criteria.

At Event 604, the UE receives cell data, including mobility and in some embodiments non-mobility data, associated with one or more neighboring cells. The mobility data may be from a neighboring mobile cell in the form of a mobility vector broadcasted by a neighboring mobile cell. The mobility vector may include velocity and directional data. Alternatively, the cell mobility data may be from a neighboring stationary cell which, through lack of a broadcasted mobility vector, indicates that the cell is stationary. At optional Event 606, the UE may receive and/or determine mobility data associated with the UE. UE mobility data is required in those embodiments of the invention in which the filtering criteria is relative mobility filtering criteria dependent upon the mobility of the UE.

At Event 608, the UE determines which of the one or more neighboring cells meets or exceeds the mobility filtering criteria and, optionally, in some embodiments, the additional non-mobility filtering criteria based on the cell data and, in some embodiments, in which the mobility filtering criteria includes relative mobility filtering criteria, based on a combination of the cell data and the UE data.

At Event 610, the UE communicates a detected cell report to the network that identifies at least one neighboring cell that has been determined to meet or exceed the filtering criteria. As previously discussed, in specific embodiments of the invention, the detected cell report may be limited to only identifying the neighboring cells that meet or exceed the mobility filtering criteria and, in some embodiments, the additional non-mobility filtering criteria. While in other embodiments, as dictated by the request to report neighboring cells, the detected cell report may include the cell data, specifically the cell mobility data (e.g., velocity/speed, directions, angle(s) or the like) and/or identification of the neighboring cells that did not meet the filtering criteria. In response to receiving the report, the UE may receive, from the network, a command to handover connection to one of the neighboring cells that meet or exceed the mobility filtering criteria and, in some embodiments, the additional non-mobility filtering criteria.

Thus, systems, devices, methods, computer program products and the like described above detail network-controlled UE filtering of detectable neighboring cells. In this regard, the present invention provides for the network to instruct currently-connected UEs to only report neighboring cells that meet network-defined mobility filtering criteria and, in some embodiments of the invention, additional non-mobility filtering criteria. The mobility filtering criteria may be absolute and/or relative mobility filtering criteria that is independent and/or dependent upon UE mobility characteristics. In response to receiving such instructions from the network, the UEs apply the mobility filtering criteria and, in some embodiments, non-mobility filtering criteria, to at least the data associated with neighboring cells, specifically the mobility data and, in some embodiments, the mobility data related to the UE, to determine which of the neighboring cells meet the filtering criteria. Once the UEs have determined that one or more neighboring cells meets the filtering criteria, the UEs communicate a detected cell report back to the network, which, according to specific embodiments of the invention, may be limited to identification of the neighboring cells that meet the mobility filtering criteria and, in some embodiments additional non-mobility filtering criteria or, in some embodiments limited to identification along with the data, specifically the mobility data, associated with the identified neighboring cells that meet the mobility filtering criteria.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for network-controlled filtering of detected cell reporting, the method comprising:
   receiving, at a user equipment (UE), a network-based request to report detectable neighboring cells, wherein the network-based request comprises a mobility filtering criteria relating to a mobility characteristic of the detectable neighboring cells, and a non-mobility filtering criteria;
   in response to receiving the network-based request, receiving at the UE, cell data broadcast from a plurality of detectable neighboring cells, wherein the cell data comprises mobility characteristics of the plurality of detectable neighboring cells;
   determining, at the UE based on the received cell data, which of the plurality of detectable neighboring cells have a cell mobility characteristic that meets or exceeds the mobility filtering criteria; and
   in response to determining that at least one detectable neighboring cell has a cell mobility characteristic that meets or exceeds the mobility filtering criteria, communicating, to the network, a detected cell report that identifies the at least one detectable neighboring cell determined to have the cell mobility characteristic that meets or exceeds the mobility filtering criteria without identifying one or more others of the plurality of detectable neighboring cells that do not have the cell mobility characteristic that meets or exceeds the mobility filtering criteria.

2. The method of claim 1, wherein the determining further comprises:
   determining, at the UE, which of the plurality of detectable neighboring cells meets or exceeds the non-mobility filtering criteria based at least on the cell data.

3. The method of claim 2, wherein the communicating, further comprises:
   communicating, to the network, a detected cell report that identifies at least one detectable neighboring cell:
      that has been determined to have the cell mobility characteristic that meets or exceeds the mobility filtering criteria; and
      that has been determined to meet or exceed the non-mobility filtering criteria.

4. The method of claim 1, wherein the communicating the detected cell report further comprises:
   communicating, to the network, cell data from the at least one detectable neighboring cell determined to have the cell mobility characteristic that meets or exceeds the mobility filtering criteria.

5. The method of claim 1, wherein the receiving the network-based request comprises:
   receiving a network-based request comprising mobility filtering criteria comprising one or more of:
      absolute mobility filtering criteria, that is independent of a mobility characteristics of the UE, and/or
      relative mobility filtering criteria, that is dependent on the mobility characteristics of the UE.

6. The method of claim 5, wherein the receiving the network-based request comprising the absolute mobility filtering criteria comprises receiving the network-based request comprising absolute mobility filtering criteria comprising one or more of:
   cells with a velocity below a predetermined threshold,
   cells moving at a predetermined direction,
   cells within a predetermined angle of velocity, and/or
   cells with a velocity of zero.

7. The method of claim 5, wherein the receiving the network-based request comprising the relative mobility filtering criteria comprises receiving the network-based request comprising relative mobility filtering criteria comprising one or more of:
   cells with a velocity within a threshold range of a velocity of the UE,
   cells moving in a direction within a threshold range of a direction of the UE, and/or
   cells having an angle of velocity within a threshold range of an angle of velocity of the UE.

8. The method of claim 1, further comprising determining or receiving, at the UE, UE data.

9. The method of claim 8, wherein the determining, at the UE, which of the plurality of detectable neighboring mobile cells have the cell mobility characteristic that meets or exceeds the mobility filtering criteria further comprises:
   determining, at the UE, which of the plurality of detectable neighboring cells have the cell mobility characteristic that meets or exceeds the mobility filtering criteria based at least on the cell data and the UE data.

10. The method of claim 1, wherein the receiving, at the UE, the cell data further comprises:
    receiving, at the UE, a mobility vector from a first detectable neighboring cell of the plurality of detectable neighboring cells, wherein the mobility vector identifies one or more of a current direction of movement of the first detectable neighboring cell, a current velocity of the first detectable neighboring cell, an average velocity of the first detectable neighboring cell, and/or a current angle of velocity of the first detectable neighboring cell.

11. The method of claim 1, wherein the receiving the network-based request occurs in response to the UE reporting an event that triggers the network to request reporting of neighboring mobile cell mobility.

12. The method of claim 11, wherein the receiving the network-based request occurs in response to the UE reporting the event,
    wherein the event comprises a signal quality of a current serving cell being detected as below a predetermined signal quality threshold.

13. The method of claim 1, wherein the receiving the network-based request further comprises:
    receiving, at the UE, a Radio Resource Control (RRC) reconfiguration signal comprising request to report a mobility of the detectable neighboring cells.

14. The method of claim 13, wherein the receiving the network-based request further comprises:

receiving, at the UE, the RRC reconfiguration signal comprising an eNodeB signaled field in the reporting configurations that comprise the mobility filtering criteria.

15. The method of claim 1, further comprising, in response to communicating the detected cell report, receiving, at the UE, a handover command from the network that specifies handover to one of the plurality of detectable neighboring mobile cells that meets or exceeds the mobility filtering criteria.

16. A user equipment (UE) device for filtering detected cell reporting based on network-defined cell mobility filtering criteria, the device comprising:
 a computing platform comprising a memory and a processor in communication with the memory; and
 a detected cell reporting and filtering module stored in the memory, the detected cell reporting and filtering module being executable by the processor to:
  receive, from a network, a request to report detectable neighboring cells, wherein the request comprises a mobility filtering criteria relating to a mobility characteristic of the detectable neighboring cells, and a non-mobility filtering criteria,
  in response to receiving the request, receive cell data associated with a plurality of detectable neighboring cells, wherein the cell data comprises a mobility characteristic,
  determine based on the received cell data which of the plurality of detectable neighboring cells has a cell mobility characteristic that meets or exceeds the mobility filtering criteria based at least on the cell data, and
  in response to determining that at least one detectable neighboring cell has a cell mobility characteristic that meets or exceeds the mobility filtering criteria, communicate, to the network, a detected cell report that identifies the at least one detectable neighboring cell determined to have the cell mobility characteristic that meets or exceeds the mobility filtering criteria without identifying one or more others of the plurality of detectable neighboring cells that do not have the cell mobility characteristic that meets or exceeds the mobility filtering criteria.

17. The device of claim 16, wherein the detected cell reporting and filtering module is further configured to:
 determine which of the plurality of detectable neighboring cells that have the cell mobility characteristic that meets or exceeds the mobility filtering criteria and non-mobility filtering data based at least on the cell data, and
 communicate, to the network, the detected cell report that identifies the at least one detectable neighboring cell that has been determined to have the cell mobility characteristic that meets or exceeds the mobility filtering criteria and the non-mobility filtering criteria.

18. The device of claim 16, wherein the detected cell report further comprises cell data from the at least one detectable neighboring cell that has been determined to have the cell mobility characteristic that meets or exceeds the mobility filtering criteria.

* * * * *